R. SAYERS.
ATTACHMENT FOR COOKING UTENSILS.
APPLICATION FILED JAN. 26, 1917.
1,232,851. Patented July 10, 1917.
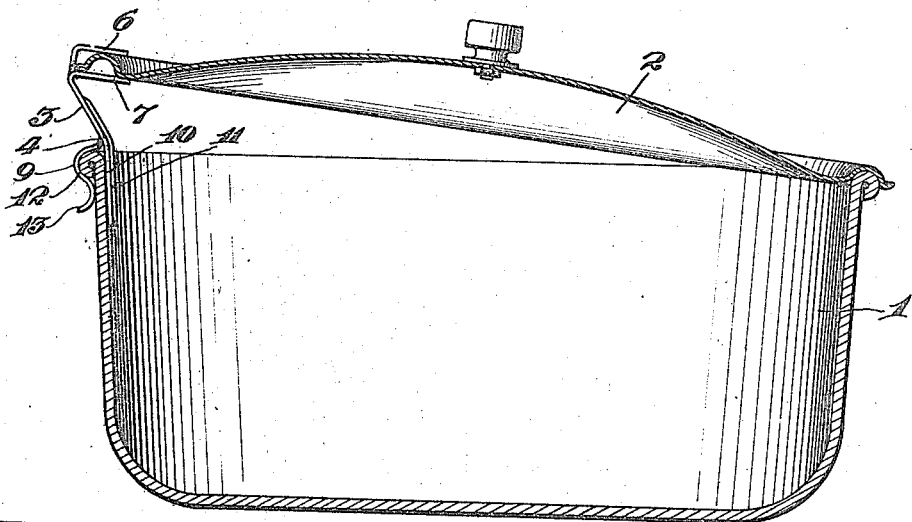
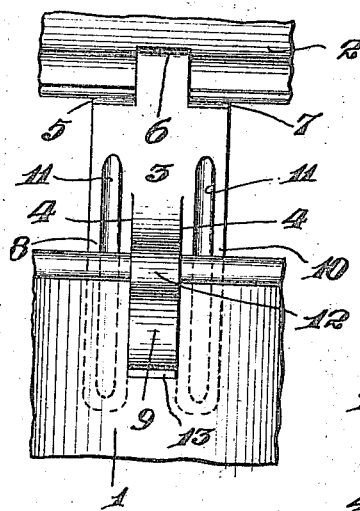
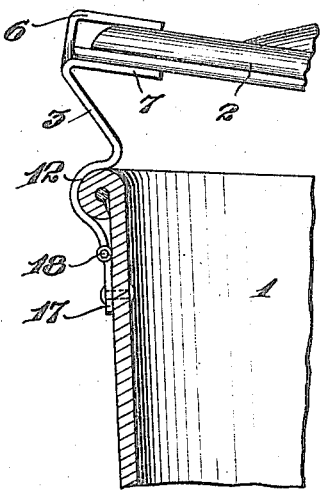
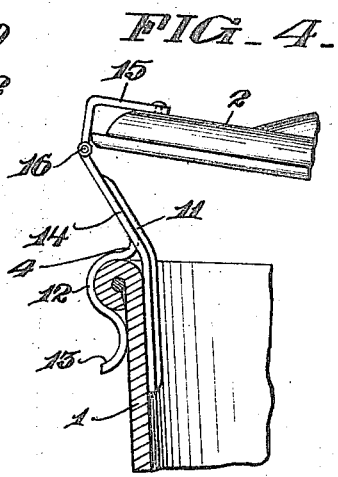
Inventor
Rose Sayers,
By Joshua R. H. Potts.
her Attorney
Witness
Wm. Conway.
C. R. Ziegler.

UNITED STATES PATENT OFFICE.

ROSE SAYERS, OF PHILADELPHIA, PENNSYLVANIA.

ATTACHMENT FOR COOKING UTENSILS.

1,232,851.  Specification of Letters Patent.  Patented July 10, 1917.

Application filed January 26, 1917. Serial No. 144,596.

*To all whom it may concern:*

Be it known that I, ROSE SAYERS, a citizen of the United States, residing at Philadelphia, in the county of Philadelphia and State of Pennsylvania, have invented certain new and useful Improvements in Attachments for Cooking Utensils, of which the following is a specification.

My invention relates to improvements in attachments for cooking utensils, the object of the invention being to provide an attachment which will hold a lid at an angle or partially opened position so as to prevent boiling over of the contents of the cooking utensil.

A further object is to provide an attachment of the character stated which can be utilized in connection with any ordinary cooking utensil, and which is of simple inexpensive construction, and efficiently performs the functions for which it is intended.

With these and other objects in view, the invention consists in certain novel features of construction and combinations and arrangements of parts as will be more fully hereinafter described and pointed out in the claims.

In the accompanying drawings:

Figure 1 is a view in section through a cooking utensil and lid illustrating my improved attachment in operative position.

Fig. 2 is an enlarged view showing my improved attachment in elevation and connected to the cooking utensil and lid.

Fig. 3 is a fragmentary view partly in section and partly in elevation illustrating a modification.

Fig. 4 is a similar view illustrating another modification.

1 represents a cooking utensil or receptacle, and 2 an ordinary lid. I would have it understood that my invention is not limited to any construction of cooking utensil or lid, and the form shown is for purposes of illustration only.

3 represents my improved attachment which comprises a sheet of metal having two longitudinal slits 4 at both ends, so that three tongues are formed at both ends of the metal sheet as will now be described.

The three tongues 5, 6, and 7, at the upper end of the attachment are bent at right angles with the intermediate tongue 6 in a higher plane than the side tongues 5 and 7, so as to grasp the lid as shown clearly in Figs. 1 and 2.

The three tongues 8, 9, and 10, which are formed at the lower end of the attachment by the slits 4 are adapted to engage the cooking utensil 1.

The outside tongues 8, 10, are preferably strengthened by longitudinal corrugations 11, while the intermediate tongue 7 is curved longitudinally so that said tongue at its intermediate portion engages over the bead of the receptacle 1 as indicated at 12, and at its free end flares outwardly as shown at 13, which permits a ready positioning of the attachment on the receptacle.

The metal plate forming the attachment 3 is of sufficient elasticity to insure a tight gripping action against the receptacle and cover, and when in position supports the lid at an incline as shown clearly in Fig. 1 to allow the steam to escape and prevent boiling over of the contents.

In Fig. 4, I provide an attachment 14 in which the lower portion is constructed precisely like the attachment shown in Figs. 1 and 2, but the upper portion comprises a tongue 15 secured to the lid and connected by a hinge 16 with the lower portion of the attachment, so that the attachment is a permanent part of the lid and can be swung on the hinge 16, either to operative or inoperative position.

In Fig. 3, I illustrate another modified form of attachment in which the upper portion thereof is precisely like the form shown in Figs. 1 and 2, but the lower portion comprises a tongue 17 which is secured to the receptacle 1, and is connected by a hinge 18 with the main portion of the attachment. In this modification the attachment is a permanent part of the receptacle, and can be swung on its hinge either to operative or to inoperative position.

Various other slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. An attachment of the character described, comprising a plate having three tongues at both ends, the tongues at one end adapted to grip a receptacle, and the tongues at the other end adapted to grip a lid, substantially as described.

2. An attachment of the character described, comprising a spring metal plate having parallel slits in both ends forming three tongues at both ends of the plate, the tongues at one end of the plate bent at right angles and adapted to grip a receptacle lid, the intermediate tongue at the other end of the plate curved and adapted to engage the outer portion of a receptacle, while the other tongues of the same end bear against the inner face of the receptacle, substantially as described.

In testimony whereof I have signed my name to this specification in the presence of two subscribing witnesses.

ROSE SAYERS.

Witnesses:
RHODA E. GILLIES,
CHAS. E. POTTS.

Copies of this patent may be obtained for five cents each, by addressing the "Commissioner of Patents, Washington, D. C."